United States Patent Office 3,468,688
Patented Sept. 23, 1969

3,468,688
NONPERMANENT PROTECTIVE COATING COMPOSITION AND METHOD
Bill Mitacek and Andrew E. Skeen, Bartlesville, Okla., assignors to Phillips Petroleum Company, a corporation of Delaware
No Drawing. Filed May 2, 1966, Ser. No. 546,601
Int. Cl. C09d 3/24
U.S. Cl. 106—285      8 Claims

ABSTRACT OF THE DISCLOSURE

A composition and method for protecting surfaces which can be painted by applying protective coating composition comprising a light cycle oil and a small proportion of at least one anti-penetrant selected from detergent removable silicone and non-soap lubricant grease containing a polymer of ethylene.

---

This invention relates to a nonpermanent coating composition. It also relates to a method of protecting surfaces.

According to one concept of the invention, a nonpermanent protective coating composition is prepared by adding a film-forming hydrocarbon soluble anti-penetrant selected from organosilicon compounds known as silicones, and a non-soap grease containing a polyolefin polymer to a light cycle oil, the latter being defined below. According to another concept of the invention, a metal surface, which can be painted, is protected against adherence of dust, dirt, cement or other particles or soil by covering the same with a composition comprising a light cycle oil and a small proportion of a film-forming anti-penetrant as herein defined.

Surfaces on tanks or other containers which are subjected to the influence of corrosive, adhering substances by splattering or misting are often protected by a nonpermanent repellent film which is washed off during periodic cleaning operations. These coatings prevent adherence of particles or droplets to the permanent finish or metal surfaces where their removal causes pitting and leads to bare spots which undergo rapid corrosion. Presently, such coating compositions usually consist of a highly volatile hydrocarbon component which is flammable and a polymeric, detergent removable substance dissolved in this hydrocarbon base which forms the actual protective coatings.

We have now compounded a mixture of a less volatile oil of relatively high ignition temperature and low flammability containing just enough polymeric, detergent removable substance to provide adhesivity to the oil which then forms the protective coating.

Thus, we have found that a composition of light cycle oil, as obtained from the catalytic cracking of gas oil in a petroleum refinery, further described herein, admixed with a small proportion of a silicone such as Dow-Corning 200 Fluid, or a non-soap grease, as later defined, can be applied to a concrete truck as a protective coating therefor and that the truck, when washed daily or weakly under severe service conditions in which wet cement particles have deposited on the external surfaces of the rotating drum of the truck, could be washed and that full protection over the entire test ring, leaving no visible marks on the surface, was obtained over a period of up to several months, best results being obtained in the case of the formulations used with the silicones.

It is an object of this invention to provide a nonpermanent protective coating composition. It is another object of this invention to provide a nonpermanent protective coating method for protecting surfaces against permanent adherence of dirt, dust, cement particles and other soil.

It is a further object of this invention to provide a nonpermanent coating composition which, when it has been on a surface to be protected for an extended period of time, can, nevertheless, be washed therefrom, leaving a "good as new" surface showing.

Other concepts, objects and the several advantages of the invention are apparent from a study of this disclosure and the appended claims.

According to the presently preferred form of the invention, there is admixed a rather small quantity of a polymeric, detergent removable substance, for example approximately about 0.10 to about 2 percent by weight of a silicone, preferably 0.2 to 0.3 percent by weight, with a light cycle oil to provide a nonpermanent, protective coating which can be washed from a surface to which it has been applied.

The light cycle oil used according to the invention is so denominated in the petroleum oil refinery and is obtained from the catalytic cracking at elevated temperature of feedstocks including substantial quantities of gas oils. A light cycle oil which has been used according to the invention in the examples given herein possesses the following properties:

| | |
|---|---:|
| Initial boiling point (IBP) _____ ° F__ | 447 |
| Aniline point _____ | ~130 |
| ASTM color _____ | 1 |
| API gravity _____ | ~30 |
| Pour point _____ ° F__ | 10–15 |

Other typical light cycle oils which are given by way of example are:

| | A | B | C | D | E |
|---|---|---|---|---|---|
| API gravity | 30 | 32 | 27 | 26 | 26 |
| Distillation: | | | | | |
|   Initial boiling point | 475 | 415 | 450 | 460 | 440 |
|   Temperature at which 50% by volume has distilled | 530 | 515 | 530 | 525 | 545 |
|   End point of distillation, no residue | 610 | 615 | 630 | 615 | 635 |
| ASTM color | 1.0 | 1.5 | 1.5 | 0.5 | 1.5 |

From the foregoing it will be seen that the light cycle oil has an API gravity in the range 26–30; an initial boiling point in the range 415–475° F., an end point in the range 610–635° F. and is obtained from catalytic cracking at elevated temperature of feedstocks, including substantial quantities of gas oil.

It will be understood that the light cycle oils which have been characterized here are not exclusive of other equivalent oils which are within the scope of the appended claims.

It will be understood by one skilled in possession of this disclosure having studied the same that he can determine by mere routine tests oils equivalent to the light cycle oils of the invention and silicones or other polymeric, detergent removable oils or substances for admixture therewith. Further, the non-soap greases which are suitable to obtain results according to the invention are described in U.S. Patent No. 3,112,270, issued Nov. 26, 1963, and the compositions there described are generally suitable.

It will be noted that the invention conceived involves the formulation of a composition which will adhere sufficiently strongly to a surface for a time to protect the said surface but it is one that can be removed by washing without leaving traces or causing discoloration of the surface it has been protecting.

The silicones which are now considered to be especially adapted to the formulations of the invention are known in the trade as Dow-Corning 200 Fluids (Dow-Corning Silicone Notebook—Reference, 2003, 1952). The chemical structure of these fluids is elucidated in the "Notebook." The various silicone fluids are to an extent useful in the formulation of the invention. However, those having a viscosity of the order of about 350 centistokes have been found to yield the very desirable results reported hrein.

EXAMPLE I

Laboratory tests were conducted on painted steel panels. The coating was applied and wet cement was spattered on the surfaces and allowed to dry for 2-4 days. The panels were then washed with detergent water from a garden hose nozzle. The cement particles washed off readily and easily and the painted surface was not marred, pitted or otherwise damaged. The coating which was used was the light cycle oil above first set out containing in one test 0.2 weight percent of Dow Corning 200 silicone fluid having a viscosity of about 350 centistokes and in another 1.0 weight percent of this oil. In both cases, full protection was obtained and decreasing to the lower value did not cause loss of effectivity. The surfaces washed off cleanly leaving no visible marks. Light cycle oil by itself gave only 24 hour protection, whereas after 48 hours concrete had hardened on the surface sufficiently to leave discoloration after washing off the oil.

EXAMPLE II

Formulations as in Example I, but containing "Prelube O" [1] in an amount of the order of one percent by weight of the oil, were prepared and tested and found to yield good results.

EXAMPLE III

Formulations as in Example I, but containing "Prelube O" in lieu of the silicone fluid, were prepared and tested. Though effective, this formulation is not now preferred.

It has been found that the composition according to the invention is always as good and sometimes slightly better than a usual mixture of one quart of motor oil and eight gallons of kerosene heretofore used and indeed a considerable improvement over a commercial, highly flammable composition containing 10 percent by weight of silicones retailing at several dollars a gallon.

An incidental advantage of the composition of the invention is that it is not only more readily and safely applied but that it also reduces friction when used on concrete shutes, for example.

The composition or formulation of the invention is economical and it can be applied readily to surfaces to be protected by conventional means such as cloth applicators, brushing or spraying and the like.

Reasonable variation and modification are possible within the scope of the foregoing disclosure and the appended claims to the invention, the essence of which is that it has been found that the addition of a small amount of a polymeric, detergent removable substance such as a silicone of the character herein set forth will yield a nonpermanent, protective coating readily washed from a surface to which it is applied and which will while it is on the surface protect for long periods of time against deposition or adherence in a permanent manner of dust particles, cement particles, soil and the like, leaving no traces or marring of the suface when finally washed therefrom.

We claim:

1. A nonpermanent, petroleum hydrocarbon, oily protective coating composition which can be washed from a surface to which it has been applied to protect the same against dirt, particles of dust, cements, other soil and the like, which consists essentially of a light cycle oil which has an API gravity in the range 26-30; an initial boiling point in the range 415-475° F., an end point in the range 610-635° F. and is obtained from catalytic cracking at elevated temperature of feedstocks, including substantial quantities of gas oil and a small proportion in the approximate range of from about 0.1 to about 2.0 percent by weight of at least one anti-penetrant selected from detergent removable silicone fluid and non-soap lubricant grease comprising essentially a lubricating oil and a polymer of ethylene having a density of at least 0.940 at 25° C.

2. A composition according to claim 1 wherein the polymeric, detergent soluble oily substance is the silicone fluid.

3. A composition according to claim 2 wherein there is added to the light cycle oil approximately 0.1 to about 2 weight percent of the silicone and wherein the fluid has a viscosity of the order of about 350 centistokes.

4. A method of protecting a surface against permanent adherence of dirt, cement particles, soil and the like, which comprises applying thereto for a period of time during which protection is desired a composition according to claim 1.

5. A method of protecting a surface against permanent adherence of dirt, cement particles, soil and the like, which comprises applying thereto for a period of time during which protection is desired a composition according to claim 2.

6. A composition according to claim 1 wherein the anti-penetrant is the non-soap lubricant grease and it contains of the order of about 6 percent of said polyethylene.

7. A composition according to claim 1 wherein the anti-penetrant portion of the composition contains both the silicone and the non-soap grease each being present therein in an amount of the order of about 1 percent.

8. A composition according to claim 1 wherein the non-soap lubricant grease is used in an amount of the order of about 1 percent by weight of the cycle oil.

References Cited

UNITED STATES PATENTS

| | | |
|---|---|---|
| 2,541,838 | 2/1951 | Shardlow. |
| 2,868,657 | 1/1959 | Sesso. |
| 2,927,909 | 3/1960 | Lyons et al. |
| 3,027,201 | 3/1962 | Foster et al. |
| 3,112,270 | 11/1963 | Mitacek et al. ____ 252—59 XR |

JULIUS FROME, Primary Examiner

JOAN B. EVANS, Assistant Examiner

U.S. Cl. X.R.

252—41

---

[1] "Prelube O" is a trademark of the Phillips Petroleum Company and is applied to a non-soap grease comprising essentially a lubricating oil and an ethylene polymer having a density of at least 0.940 gram per cubic centimeter at 25° C. The penetration of the "prelube O" used in the example is in the range 355-385. It contains six percent of Marlex [a] 6050 polymer.

[a] Registered trademark of Phillips Petroleum.